United States Patent [19]

Epstein

[11] 4,352,768

[45] Oct. 5, 1982

[54] FIBER REINFORCED CATHODE FOR ELECTROCHEMICAL CELL

[75] Inventor: James Epstein, Sharon, Mass.

[73] Assignee: GTE Laboratories Incorporated, Waltham, Mass.

[21] Appl. No.: 93,572

[22] Filed: Nov. 13, 1979

Related U.S. Application Data

[62] Division of Ser. No. 939,584, Sep. 5, 1978, abandoned.

[51] Int. Cl.³ .............................................. C04B 35/52
[52] U.S. Cl. ..................................... 264/105; 264/127
[58] Field of Search ...................... 264/105, 29.1, 29.2, 264/29.5

[56] References Cited

U.S. PATENT DOCUMENTS

| | | | |
|---|---|---|---|
| 2,799,053 | 7/1957 | Gartland | 264/105 |
| 3,658,976 | 4/1972 | Slade | 264/105 |
| 3,838,188 | 9/1974 | Farrell | 264/105 |
| 4,102,960 | 7/1978 | Borkowski | 264/105 |
| 4,127,634 | 11/1978 | Joo | 264/105 |
| 4,161,063 | 7/1979 | Goebel et al. | 264/105 |

Primary Examiner—John A. Parrish
Attorney, Agent, or Firm—David M. Keay

[57] ABSTRACT

An improved preformed cathode is described for use in a primary electrochemical cell. The novel cathode of the present invention is a self-supporting member having a configuration which is determined by the spatial limitations of the particular primary electrochemical cell in which the cathode is to be utilized. The cathode is formed from about 65 to 94 weight percent of carbon black, at least 1 weight percent of a mechanical binder which is inert in the primary electrochemical cell, 1 to 10 weight percent of a fibrous material such as carbon, glass, ceramic fluoropolymer, and/or metallic fibers, and any remainder thereof is graphite powder. The preformed cathode is formed by mixing the individual components together with a quantity of a suitable liquid to form a uniform mixture which is sheeted to a self-supporting structure of the desired thickness. Thereafter, the preformed cathode is dried, cured for a period of time sufficient to remove substantially all of the liquid and to stabilize the mechanical binder, and cut into discs for assembly into cells.

8 Claims, 2 Drawing Figures

FIBER REINFORCED CATHODE FOR ELECTROCHEMICAL CELL

This is a division, of application Ser. No. 939,584, filed Sept. 5, 1978 now abandoned.

BACKGROUND OF THE INVENTION

The present invention is related generally to primary electrochemical cells and is more particularly concerned with a novel preformed cathode for use in such cells and a method for its formation.

Primary electrochemical cells are utilized for a wide variety of applications and are commonly available in a significant assortment of sizes and shapes. Furthermore, a number of electrochemical systems are known for incorporation into such primary electrochemical cells. A large portion of these systems utilize a carbon cathode material. Typically, the carbon cathode material is formed as a paste and deposited as such within the electrochemical cell container. Because of the fluid form of this paste, albeit viscous, it is necessary to place a heavy separator between the carbon cathode material and the particular anode material utilized. This separator is required in order to prevent electrical contact between the anode and cathode materials. Necessarily, these separators become quite thick in order to prevent self-discharge of the cells due to internal shorts between the cathode and anode materials. Such a thick separator material naturally increases the internal resistance of the cell thereby decreasing the output which may be derived therefrom.

Preformed porous carbon cathodes have been developed which have significant advantages over previously known cathodes. However, cathodes of this general type have not been readily amenable to manufacture on high speed automated equipment. In the manufacturing process the desired thickness of cathode is sliced from a cathode bar by a reciprocating blade. Due to the inherent nature of the material additional labor steps are involved to suitably place the sponge cathode material into the cell container.

SUMMARY OF THE INVENTION

Briefly, the invention is seen to comprise a new and improved preformed cathode for a primary electrochemical cell and the method of its formation. The preformed cathode comprises a paper-like self-supporting structure having a fibrous reinforcement and of predetermined configuration for placement in a primary electrochemical cell. It has the following composition: from about 65 to 94 weight percent of carbon black, at least 1 weight percent of a mechanical binder which is inert in the primary electrochemical cell, 1 to 10 weight percent of a fibrous reinforcing material, and any remainder being graphite powder.

The method of forming the preformed cathode comprises the following series of steps. A quantity of carbon black with graphite powder, if desired, and the fibrous additive are mixed with a sufficient amount of a suitable liquid to form a uniform slurry. A quantity of the mechanical binder which is inert in the primary electrochemical cell is added to the slurry, the quantity of binder being at least 1 weight percent of the resulting preformed cathode. The slurry is remixed to disperse uniformly the binder through the slurry. Alternatively the fibrous additive may be added to the slurry during the remixing step or after the remixing step and the blended material mixed again. The slurry is dispersed out onto a flat surface to form a self-supporting paper-like sheet. A doctor blade can be used to achieve a sheet of substantially uniform thickness. The mixture is reduced to the desired thickness by rolling the sheet as is known in the art between sheets of absorbent material such as paper. It is then dried and cured for a time sufficient to remove substantially all of the liquid and to stabilize the mechanical binder. The sheet is then cut into discs for assembly into cells.

Accordingly, it is an object of the present invention to provide a new and improved cathode structure for use in primary electrochemical cells.

Another object of the present invention is to provide a cathode material which is simple to fabricate and handle in automatic machinery.

A still further object is to provide a reinforced cell which is better able to withstand external shock and vibrational forces.

A still further object of the invention is to provide such a new and improved cathode which is more homogeneous, more easily formed, more reproducible and more easily handled in manufacturing operations.

Figures 1, 2:
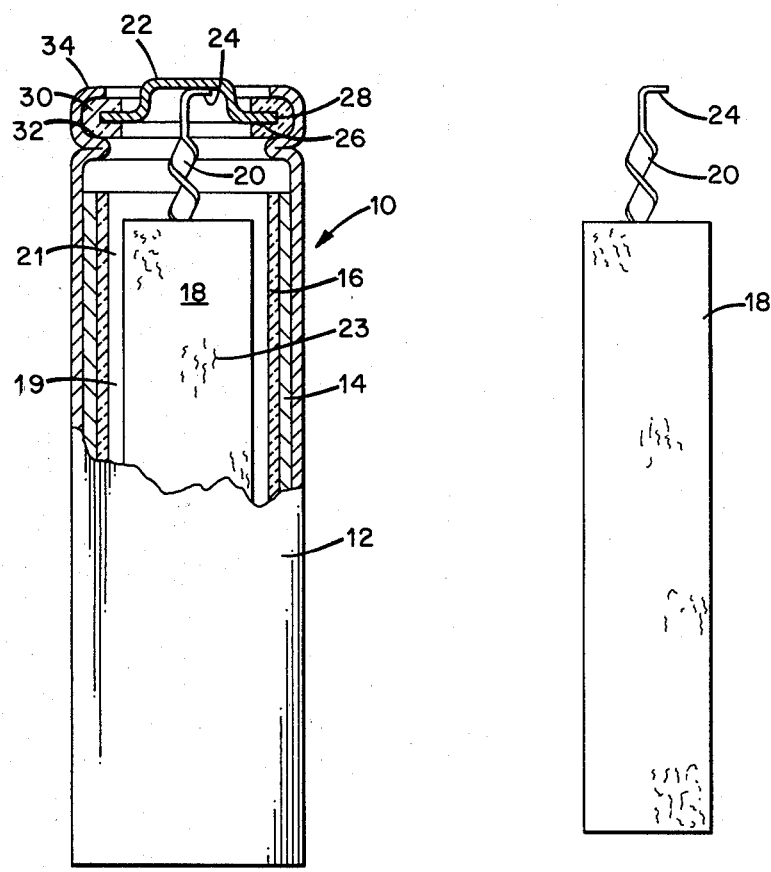
FIG. 1 is a side elevational view, partially in section, of a primary electrochemical cell according to the present invention.
FIG. 2 is a side elevational view of a preformed cathode according to the present invention with a cathode current collector assembled therein for use in the primary electrochemical cell of FIG. 1.

For a better understanding of the present invention, together with other and further objects, advantages and capabilities thereof, reference is made to the following disclosure and appended claims in connection with the above-described drawings.

DETAILED DESCRIPTION OF THE PREFERRED EMBODIMENTS

Referring initially to FIG. 1, a primary electrochemical cell embodying the present invention is designated generally by the reference numeral 10. The primary electrochemical cell 10 is comprised of a cylindrical outer casing 12 which is closed at one end and serves to contain the desired electrochemical system. In many configurations, the outer casing 12 is formed of a conductive material and acts as a first terminal of the primary electrochemical cell 10.

In this embodiment, a layer of anode material 14 is disposed in mechanical and electrical contact with the conductive outer casing 12 throughout the major portion of the internal length and circumference of the casing 12. In certain configurations, the anode also is in contact with the bottom of the casing 12. A thin porous separator 16 of electrically nonconductive material is disposed internally and coextensive of the annulus of anode material 14 to insure electrical isolation between the cathode and anode materials. In the center of the primary electrochemical cell 10, there is located a preformed carbon cathode 18 according to the present invention. In the space 19 between the preformed cathode 18 and the separator 16, there is an electrolytic solution 21 which diffuses throughout the cathode 18 and the separator 16. A cathode current collector 20 is impressed into the preformed cathode 18 over a major portion of its length. A top portion 24 of the cathode current collector 20 is specially provided for affixing the cathode current collector 20 to a metal cathode terminal cap 22. The cathode terminal cap 22 is fitted within the open end of the outer casing 12 and is insulated electrically therefrom by means of an insulating ring 30. The insulating ring 30 rides against an internal shoulder 32 formed in the outer casing 12 above the electrochemical materials of the cell. The ring 30 supports the cathode terminal cap 22 by receiving a radially extending lower rim 26 of the cap 22 in an internal groove 28. A top lip 34 of the outer casing 12 is rolled or crimped over the upper surface of the ring 30 to bring the various mating surfaces into sealing contact. The number 23 designates any fibrous additive appearing on the surface of the cathode of this invention.

A preformed cathode of the present invention has the following general composition: from about 65 to 94 weight percent of carbon black, at least 1 weight percent of a mechanical binder which is inert in the primary electrochemical cell and 1 to 10 percent fibrous material. Graphite powder may also be included up to 30 weight percent.

The graphite and carbon black utilized in the formation of the preformed cathodes are preferably of commercial grade or better purity. The graphite particle size is preferably maintained below 650 mesh and the carbon black utilized is preferably compressed about 50%. These preferred specifications for the graphite and carbon black are selected to insure a homogeneous product which will not contribute to a deterioration of the discharge parameters of the cell through the incorporation of reactive impurities in the cell.

The preferred mechanical binder for utilization in the preformed cathodes of the present invention is a fluorocarbon polymer which is inert in the primary electrochemical cell of the invention. Two examples of preferred fluorocarbon polymers of particular utility in the present invention are those identified by the tradenames Teflon and Kel-F. Teflon is a registered trademark of E. I. duPont de Nemours and Company for tetrafluoroethylene fluorocarbon polymers and fluorinated ethylenepropylene resins. Kel-F is a registered trademark of the 3M Company for a series of fluorocarbon products including polymers, of chlorotrifluoroethylene and certain copolymers. The function of the fluorocarbon polymer in the present invention is to stabilize the mechanical strength of the cathode by forming chain-like connections between the various particles of graphite, the fibrous additive, and carbon black to form a mechanical binding network so that a self-supporting configuration may be adhered for the preformed cathode.

The fibrous additive of this invention is seen to range from about 1 to about 10 weight percent of the cathode composition. The additive may be selected from the members of the group consisting of carbon fibers, glass fibers, ceramic fibers such as silicates, fluropolymer fibers, and metallic fibers such as nickel or stainless steel and mixtures thereof. The addition of carbon or metallic fibers increases the conductivity of the cathode.

Thus it was found that when a conventional carbon black, graphite, fluropolymer composition, (A), had 5% of the carbon black replaced by carbon fibers to form a mixture (B), a self-supporting paper-like sheet was formable instead of a spongy mass, and that the (B) composition cathode material when placed in a similar cell to (A) resulted in a load voltage 100 mV higher than the (A) material cell.

Since the electrical conductivity of the cathode is increased by the addition of carbon or metallic fibers, the current capability of the battery is also increased.

It is seen that the glass, ceramic, and fluropolymer fibers serve only one of the two functions of the carbon or metallic fibers; that is, to reinforce the structure against shock and vibration, though decreasing the conductivity of the cathode.

For all of the fibrous additives, the fibers should range in length from 3 to 7 mm, and in diameter from 5 to 10 $\mu$m.

The liquid to be employed in the preparation of the slurry is a matter of choice, so long as it succeeds in wetting the fiber, carbon and graphite particles. The quantity of liquid to be utilized varies according to the choice of liquid and the properties of the dough needed for the particular forming operation. A determination of such effective quantities is standard to one of ordinary skill in the art.

Preferably, the suitable liquid chosen is one which volatilizes completely so that no contaminating residue is left in the cathode. However, if such a residue is insert to the chemicals in the electrochemical cell, a non-totally volatilized liquid may also be used so long as the residue does not significantly affect the cathode composition.

The following are utilizable as liquids in the practice of the invention: glycols, such as ethylene glycol, butylene glycol and 2,3-hexanediol; alcohols, particularly lower molecular weight alcohols, such as methanol, ethanol, and isopropanol; ketones, such as acetone, methylethylketone, and diethyl ketone alhoxy—or aralhyloxy—substituted alcohols, such as 2-methoxyethanol, 2 ethoxy-ethanol, 2-benzyloxy-ethanol; 2-butoxy ethanol, and amides, such as formanide; amines, such as isobutylamine and tertbutylamine; water; and mixtures thereof, particularly mixtures of water with the other liquids. However, deionized water, glycols, alcohols and mixtures thereof form the presently preferred group from which the liquid may be selected.

The following table provides a number of examples of specific compositions according to the present invention:

| EX.-AMPLE NO. | GRAPHITE POWER WT. % | FIBROUS ADDITIVE WT. % | CARBON BLACK WT. % | BINDER WT. % |
| --- | --- | --- | --- | --- |
| 1 | 0 | 1% carbon | 96 | 3 |
| 2 | 5 | 5% glass | 87 | 3 |
| 3 | 5 | 5% sodium silicate | 87 | 3 |
| 4 | 5 | 3% Kel-F | 89 | 3 |
| 5 | 0 | 5% nickel | 92 | 3 |
| 6 | 0 | 5% carbon | 92 | 3 |
| 7 | 0 | 10% carbon | 87 | 3 |
| 8 | 0 | 20% carbon | 77 | 3 |

The particular compositions for the preformed cathodes which are preferred are given in weight percent for the resulting article:

| | |
| --- | --- |
| Graphite | 0-30% |
| Carbon Black | 65-94% |
| Flurocarbon Polymer | 1-10% |
| Fibrous Additive | 1-10% |

The particular composition chosen results in a cathode having varying structural reinforcement for self-support.

The preformed cathode of the present invention is produced according to a method which also is a part of that invention. As a specific example of that method, the following procedure is provided.

EXAMPLE

About 1800 grams of carbon black are dry mixed with about 100 grams of graphite powder and 100 grams of carbon fibers for about 15 hours. Approximately 6 liters of a 50% isopropanol solution in water is added to the dry mixed carbon fibers, carbon black and graphite. This is mixed for about two additional hours. Approximately 5% by weight of the dry mix of Teflon in suspension is added to the slurry of carbon black, carbon fibers, and graphite powder as a mechanical binder and mixing continued to disperse the Teflon uniformly through the slurry. Alternatively and with equally good results, the fibers can be added at the same time as the Teflon, or even in a separate mixing step prior to the fluoropolymer addition.

The mixture is spread out in a layer between absorbent paper sheets and rolled to the desired thickness. It is then dried and cured in the manner known to the art, cut into discs and assembled into cells. The drying step was carried on for about 15 hours at room temperature and then the curing step at approximately 300° C. for about two to three hours.

The relative concentrations of the carbon black, graphite powder, fibrous additive, and mechanical binder may be varied according to the ranges set forth hereinabove.

The dry mixing of the carbon glack and graphite, and the fibers if added at this time, is to achieve a uniform distribution between the carbon and the fibers if present and the graphite particles. The time required for this procedure is largely a function of the equipment used.

The liquid is a matter of choice so long as it succeeds in wetting the dry ingredient particles. The quantity of liquid to be utilized varies according to the choice of liquid. A determination of such effective quantities is within the purview of the ability of one of ordinary skill in the art. The amount should be insufficient to overcome the reinforcement capability of the fibers resulting in a self-supported structure.

Preferably, the suitable liquid chosen is one which volatilizes completely so that no contaminating residue is left in the cathode. However, if such a residue is inert to the chemicals in the electrochemical cell, a non-totally volatilized liquid may also be used so long as the residue does not significantly affect the cathode composition. See supra.

The net mixing time is that period of time required to form a uniform slurry prior to sheeting. That period is affected by the particular equipment used, the liquid selected, and the blend of the ingredients employed.

The curing step of the procedure accomplishes two separate functions. Firstly, the liquid is removed from the formed cathode. Secondly, the mechanical binder is cured so that the binder particles become linked. These two functions may be performed separately or simultaneously and the time and temperature depend on the liquid and mechanical binder used and commercial practicality since generally an increase in temperature will shorten the process time.

The preformed carbon cathodes of the present invention are suitable for use in primary electrochemical cells which have depolarizers that can be electrochemically reduced on a high surface area carbon cathode, especially those cells having an alkali metal anode and a non-aqueous electrolytic solution which includes a liquid depolarizer. Included in the former groups are the familiar carbon-zinc cells. In the latter group are included a relatively recently developed class of cells wherein the electrolytic solution includes a liquid oxyhalide solvent material and a solute dissolved therein to make the solution ionically conductive. Suitable oxyhalide solvents include those of sulfur or phosphorus, such as phosphorus oxychloride, thionyl chloride, sulfuryl chloride, or mixtures thereof. Such oxyhalide solvent materials additionally function as the aforesaid liquid depolarizers as they are electrochemically reduced on the cathode surface during operation of the cell. Solutes which can be dissolved in the solvent material provide at least one anion of the general formulae, $MX_4{-}$, $M'X_6{-}$, and $M''Cl_6{-}$, such as lithium tetrachloroaluminate, lithium hexaflurophosphate, and lithium hexachlorostannate. Additional teachings concerning electrolytic solutions in primary electrochemical cells are provided in U.S. Pat. No. 3,922,174 which issued Nov. 25, 1975 to Adam Heller and is assigned to the assignee of the present application. An example of one such cell has a lithium anode, a carbon cathode as described herein, and an electrolyte solution containing a solvent/depolarizer such as thionyl chloride or lithium tetrachloroaluminate as the solute.

Primary electrochemical cells having lithium anodes and solvent/depolarizers as selected from the above-named group have been found to be particularly suitable for use with the preformed carbon cathodes, especially when combined with a metallic current collector. Such cells provide better and more uniform contact between the cathode and the current collector since the cathodes expand during discharge thereby improving contact between the cathode and collector and filling the space between the anode and the cathode.

The probability of intracellular shorting is reduced greatly since the cathode material is of a definite shape and cannot diffuse through a separator to contact the anode. Therefore, the separator used in cells having the preformed cathodes may be very thin or in some cases actually eliminated thereby greatly reducing the internal cell resistance.

It can also be appreciated that a stronger, more easily manufactured primary electrochemical cell results from the incorporation of this preformed carbon cathode. By mating the cathodes to the metallic current collectors, a subassembly is produced which is far more rugged than prior art structures and which may be preassembled during the cell manufacturing process. Further, since the cathode material prepared as disclosed herein is self-supporting, and quite relatively strong due to the inherent reinforcement, blanks of any size can be formed of the instant cathode material on high speed punch presses.

While there has been shown and described what are considered to be preferred embodiments of the present invention, it will be obvious to those skilled in the art that various changes and modifications may be made therein without departing from the invention as defined by the appended claims.

What is claimed is:

1. A method for forming a preformed cathode for a primary electrochemical cell comprising the steps of:
   mixing a quantity of carbon black particles with from 1 to 10 weight percent of the mixture of a fibrous additive and an effective amount of suitable liquid to form a uniform slurry;
   adding a quantity of a mechanical binder which is inert in the primary electrochemical cell to the slurry, the quantity of mechanical binder being at least 1 percent by weight of the resulting preformed cathode;
   remixing the slurry to disperse uniformly the binder through the slurry;
   sheeting the slurry;
   drying the sheeted slurry; and
   curing the preformed cathode for a time sufficient to remove substantially all of the liquid and to stabilize the mechanical binder thereby producing a self-supporting reinforced member for insertion into a primary electrochemical cell.

2. A method according to claim 1 including, subsequent to remixing the slurry, the steps of
   dispersing the slurry onto a flat surface;
   spreading the slurry out in a layer of uniform thickness;
   rolling the layer to the desired thickness; and
   subsequently drying the sheeted slurry and curing the preformed cathode.

3. A method for forming a preformed cathode for a primary electrochemical cell comprising the steps of:
   mixing a quantity of carbon black particles with a quantity of graphite powder and an effective amount of suitable liquid for forming a uniform slurry;
   adding a quantity of a mechanical binder which is inert in the primary electrochemical cell to the slurry, the quantity of mechanical binder being at least 1 percent by weight of the resulting preformed cathode;
   remixing the slurry to disperse uniformly the binder through the slurry and while remixing adding a fibrous additive in an amount of from 1 to 10 weight percent of the mixture of carbon black and graphite;
   sheeting the slurry;
   drying the sheeted slurry; and
   curing the preformed cathode for a time sufficient to remove substantially all of the liquid and to stabilize the mechanical binder thereby producing a self-supporting reinforced member, for insertion into the primary electrochemical cell.

4. A method according to claim 3 including, subsequent to remixing the slurry, the steps of
   dispersing the slurry onto a flat surface;
   spreading the slurry out in a layer of uniform thickness;
   rolling the layer to the desired thickness; and
   subsequently drying the sheeted slurry and curing the preformed cathode.

5. A method according to claim 4 wherein the quantities of carbon black and graphite are initially dry mixed to assure a uniform distribution of carbon black and graphite particles.

6. A method according to claim 5 wherein the mechanical binder is fluorocarbon polymer.

7. A method for forming a preformed cathode for a primary electrochemical cell comprising the steps of:
   mixing a quantity of carbon black particles with a quantity of graphite powder and an effective amount of suitable liquid for forming a uniform slurry;
   adding a quantity of a mechanical binder which is inert in the primary electrochemical cell to the slurry, the quantity of mechanical binder being at least 1 percent by weight of the resulting preformed cathode;
   remixing the slurry to disperse uniformly the binder through the slurry;
   adding a fibrous additive in an amount of from 1 to 10 weight percent of the mixture of carbon black and graphite;
   remixing the slurry to blend the materials;
   sheeting the slurry;
   drying the sheeted slurry; and
   curing the preformed cathode for a time sufficient to remove substantially all of the liquid and to stabilize the mechanical binder thereby producing a self-supporting reinforced member, for insertion into the primary electrochemical cell.

8. A method according to claim 7 including, subsequent to remixing the slurry to blend the materials, the steps of
   dispersing the slurry onto a flat surface;
   spreading the slurry out in a layer of uniform thickness;
   rolling the layer to the desired thickness; and
   subsequently drying the sheeted slurry and curing the preformed cathode.

* * * * *